US007013544B2

(12) United States Patent
Yasuda et al.

(10) Patent No.: US 7,013,544 B2
(45) Date of Patent: Mar. 21, 2006

(54) MACHINE TOOL AND PALLET CHANGER FOR MACHINE TOOL

(75) Inventors: Hiroshi Yasuda, Nara (JP); Tomoaki Ishida, Nara (JP)

(73) Assignee: Mori Seiki Hitech Co., Ltd., Nara (JP)

( * ) Notice: Subject to any disclaimer, the term of this patent is extended or adjusted under 35 U.S.C. 154(b) by 183 days.

(21) Appl. No.: 10/690,827

(22) Filed: Oct. 23, 2003

(65) Prior Publication Data

US 2004/0107556 A1    Jun. 10, 2004

(30) Foreign Application Priority Data

Nov. 13, 2002 (JP) .............................. 2002-329636

(51) Int. Cl.
 *B23Q 41/00* (2006.01)
 *B23Q 7/00* (2006.01)

(52) U.S. Cl. ................. 29/27 C; 29/33 P; 29/563; 82/124; 82/122; 409/221

(58) Field of Classification Search ............... 29/27 C, 29/563, 33 P; 409/165, 168, 198, 221, 224; 82/124, 122, 125, 126, 127; 414/744.1, 744.2, 414/744.3; 198/345.3, 346.1, 346.2

See application file for complete search history.

(56) References Cited

U.S. PATENT DOCUMENTS

| 3,910,419 | A | * | 10/1975 | Becker et al. ........... 198/470.1 |
| 4,712,282 | A | * | 12/1987 | Romeu ...................... 29/27 C |
| 5,678,291 | A | * | 10/1997 | Braun ........................ 29/26 A |
| 5,919,011 | A | * | 7/1999 | Schweizer .................. 409/131 |
| 5,992,608 | A | * | 11/1999 | Ahn ............................ 29/33 P |
| 6,647,605 | B1 | * | 11/2003 | Hiramoto et al. ........... 29/33 P |
| 6,679,369 | B1 | * | 1/2004 | Okuyama ................... 29/33 P |
| 6,733,217 | B1 | * | 5/2004 | Schworer et al. ........... 409/168 |

FOREIGN PATENT DOCUMENTS

JP          7-3938       1/1995

* cited by examiner

*Primary Examiner*—Boyer D. Ashley
*Assistant Examiner*—Dana Ross
(74) *Attorney, Agent, or Firm*—Armstrong, Kratz, Quintos, Hanson & Brooks, LLP (57) ABSTRACT

An APC is provided in a five-axis controlling vertical machining center. A spindle head is movable in three mutually transverse axes directions to a workpiece. A table disposed below swings to be positioned and is directed upwardly and indexed. A pallet setup base is provided outside a machining area. A pallet change arm has pallet grip portions for gripping and releasing the pallets. The arm makes a swivel motion and makes an ascending and descending motion. Thus, the pallet is transferred between the table and the pallet setup base and is received and discharged to the table and the pallet setup base.

11 Claims, 4 Drawing Sheets

MACHINE TOOL AND PALLET CHANGER FOR MACHINE TOOL

BACKGROUND OF THE INVENTION

1. Field of the Invention

The present invention relates to a pallet changer for changing pallets, on which workpieces are placed, and feeding the workpiece to a table of a machine tool and also relates to the machine tool provided with the pallet changer.

2. Description of the Related Art

For example, Japanese Utility Model Application Laid-Open No. 7-3938 discloses a pallet changer for a machine tool. The pallet changer may automatically discharge a pallet mounted on the table in the machine tool such as a machining center and may automatically feed a next pallet onto the table.

The pallet changer is provided with a base disposed in the vicinity of the table, a reciprocating base which may be moved to-and-fro on the base, a swivel shaft arranged, to be able to swivel about a vertical axis, on the reciprocating base and a swivel arm. The swivel arm has a size, such that two pallets may be placed thereon, and is supported by the swivel shaft movably in the moving direction of the reciprocating base and is swiveled together with the swivel shaft.

However, in the pallet changer described in the above-described Japanese Utility Model Application Laid-Open No. 7-3938, the reciprocating base has to move to-and-fro in the horizontal direction and to make a linear motion when the pallets are to be changed. Accordingly, the time for changing the pallets is likely to be prolonged, and also, there is a tendency that the pallet changer becomes complicated and the overall apparatus would be enlarged.

SUMMARY OF THE INVENTION

In order to overcome the above-noted defects, an object of the present invention is to provide a pallet changer, which becomes simple and compact and may change the pallets in a short period of time, and a machine tool provided with the pallet changer.

In order to attain this and other objects, according to the present invention, there is provided a pallet changer, for changing pallets, provided on a machine tool being a five-axis controlling machine tool, the machine tool comprising: a spindle head being movable in three mutually transverse axes directions relative to a workpiece supported by a pallet mounted on a table; and the table disposed below a level of the spindle head, the table is driven by a table drive unit so that the table is swingable and positioned while directing upwardly and also making at least an index motion, the pallet changer comprising: a pallet setup base, provided outside a machining area of the machine tool, for placing the pallet on the pallet setup base; and a pallet change arm, which is provided with at least one pallet grip portion for gripping and releasing the pallet, for making a swivel motion substantially in a horizontal plane and for moving up and down, wherein the pallet change arm makes the swivel motion and moves up and down so that the pallet is transferred between the table and the pallet setup base and is received and discharged to the table and the pallet setup base, respectively.

Preferably, a supporting shaft for supporting the pallet change arm is disposed in the vicinity of the machining area and outside the machining area, and a standby position of the pallet change arm is outside the machining area and in the vicinity of the machining area and is a lifted position of the pallet change arm.

Preferably, the pallet changer comprising: an APC body mounted on a bed; and an ascending and descending portion, supported by the APC body, for ascending and descending and for supporting the supporting shaft to be rotatable in a forward direction and a reverse direction, wherein a swivel servomotor for drivingly rotating the supporting shaft is mounted on the ascending and descending portion, and when the swivel servomotor is turned on and off, the pallet change arm is swiveled and positioned at a predetermined position, and the pallet change arm is swiveled in a clockwise direction and in a counterclockwise direction substantially in the horizontal plane in plan view, respectively.

Preferably, the pallet change arm is positioned in a standby position for being ready without a pallet changing operation, in a first pallet grip position, in a second pallet grip position opposite by 180 degrees to the first pallet grip position, and in another predetermined position, respectively.

Preferably, the pallet grip portions are provided on both end portions or in the vicinity of the both end portions of the pallet change arm, respectively.

A machine tool according to the present invention is provided with the pallet changer having the above-described structure. For example, the machine tool is a five-axis controlling machine tool comprising: a spindle head being movable in three mutually transverse axes directions relative to a workpiece supported by a pallet mounted on a table; and the table disposed below a level of the spindle head, the table is driven by a table drive unit so that the table is swingable and positioned while directing upwardly and also making at least an index motion, the pallet changer comprising: a pallet setup base, provided outside a machining area of the machine tool, for placing the pallet on the pallet setup base; and a pallet change arm, which is provided with at least one pallet grip portion for gripping and releasing the pallet, for making a swivel motion substantially in a horizontal plane and for moving up and down, wherein the pallet change arm makes the swivel motion and moves up and down so that the pallet is transferred between the table and the pallet setup base and is received and discharged to the table and the pallet setup base, respectively.

Preferably, the machine tool is a five-axis controlling vertical machining center in which an axis of a main spindle supported rotatably by the spindle head is directed substantially in the vertical direction to a floor surface so that the table makes a rotational motion in addition to the index motion.

Preferably, the table drive unit comprises: a swing drive unit for swinging the table; and an index drive unit for indexing the pallet and for rotating the pallet relative to the table, wherein the swing drive unit for supporting the table to be swingable at both ends is disposed in front of the machine tool, and the index drive unit is provided on the table, and the swing drive unit is driven so that the table and the index drive unit are swung and indexed at a predetermined position.

Preferably, the machine tool performs a cutting by a rotating tool and performs a turning by a turning tool to the workpiece.

With such a structure of the pallet changer according to the present invention, it is possible to change the pallets in a short period of time and the structure of the pallet changer becomes simple and compact.

BRIEF DESCRIPTION OF THE DRAWINGS

FIGS. 1 to 3J show an embodiment of the present invention.

DESCRIPTION OF THE PREFERRED EMBODIMENTS

An embodiment of the present invention will now be described with reference to the accompanying drawings FIGS. 1 to 3J.

Figure 1:
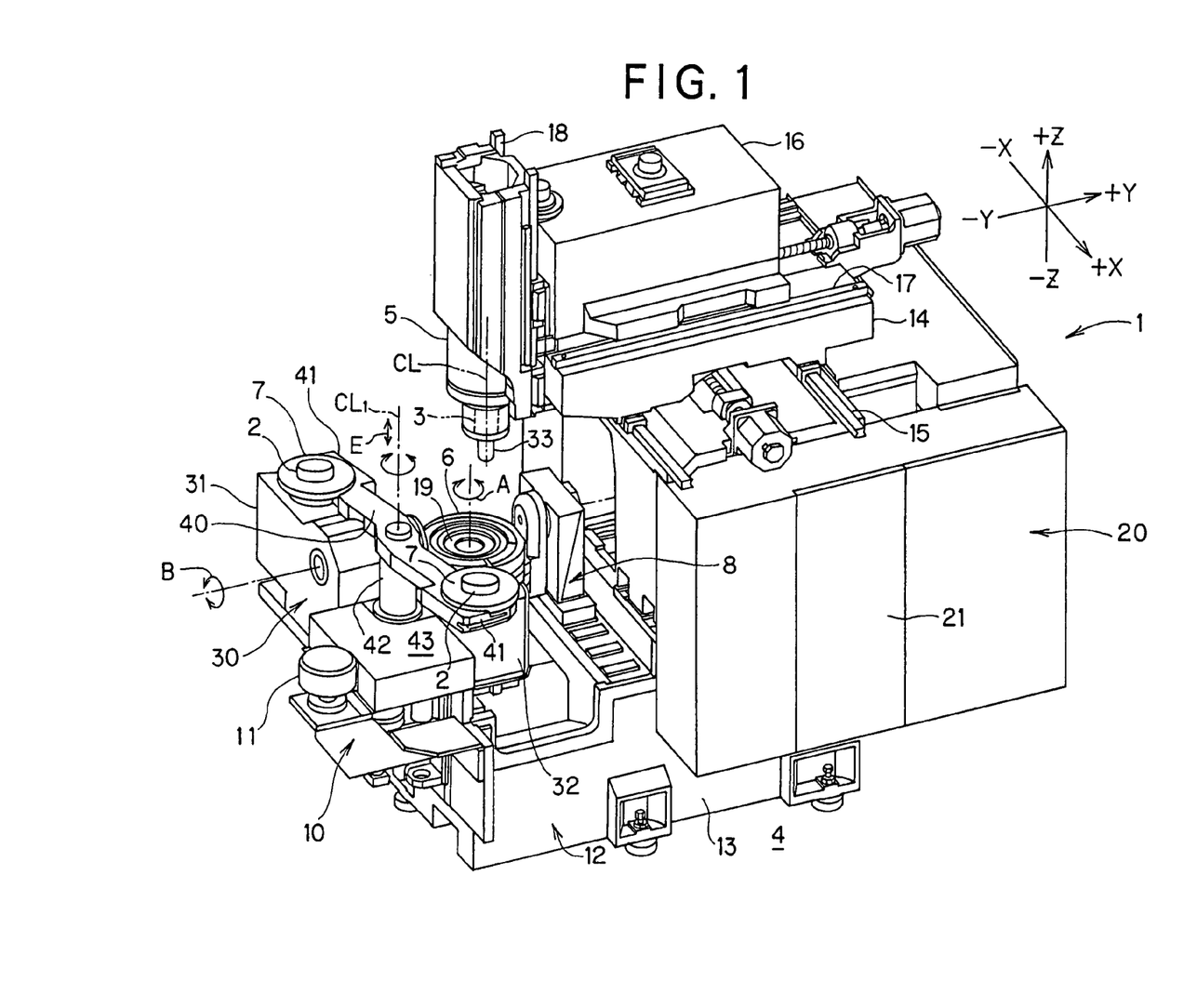
FIG. 1 is a perspective view of a vertical machining center.
Figure 2:
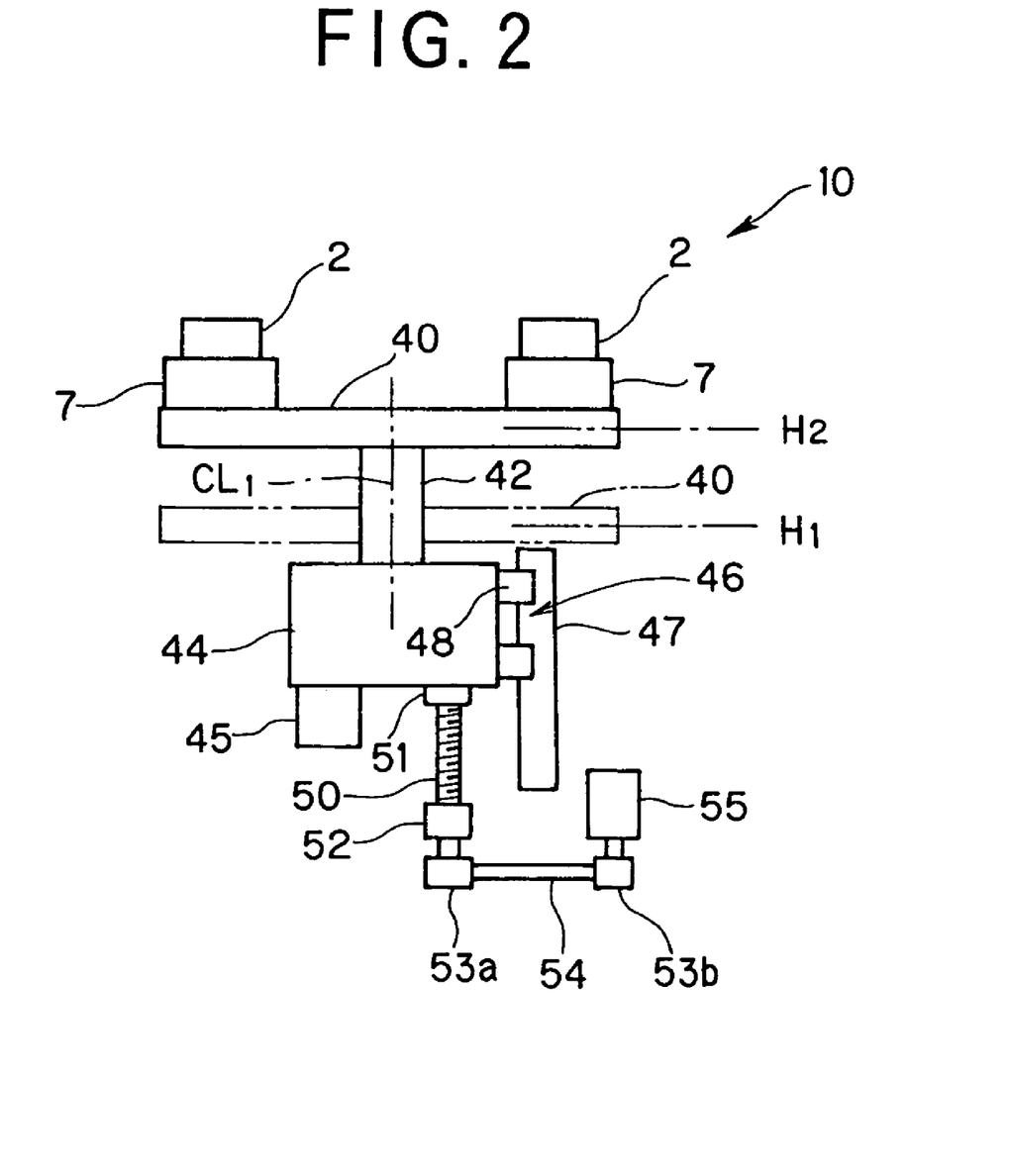
FIG. 2 is an illustration of the operation of an automatic pallet changer provided in the vertical machining center.

FIG. 1 is a perspective view of a vertical machining center. FIG. 2 is a schematic structural view of the operation of an automatic pallet changer provided in the vertical machining center. FIGS. 3A to 3J are illustrations of the operation of the automatic pallet changer.

FIGS. 1 to 3J show the vertical machining center (hereinafter referred to as MC) 1 as a machine tool according to this embodiment. This MC 1 is the machine tool which may machine a workpiece 2 in a five-axis control.

The MC 1 is controlled by a controller 20 which is composed of an NC (numerical control) unit and a programmable logic controller (PLC). Incidentally, the controller 20 may be a controller in which the PLC portion is built in the NC unit.

An axis CL of a main spindle 3 of the MC 1 is directed in the vertical direction to a floor surface 4. Incidentally, the axis CL may be directed in a direction which is slanted at a predetermined angle to the vertical direction (also in this case, the direction is regarded as "substantially the vertical direction to the floor surface").

A spindle head 5 rotatably supports the main spindle 3. The spindle head 5 is movable in three mutually transverse axes directions (X-axis direction, Y-axis direction and Z-axis direction) relative to the workpiece 2 supported by a pallet 7. A table 6 which may support the pallet 7 is arranged beneath the spindle head 5.

In this embodiment, there is shown a case in which the spindle head 5 is moved in the three mutually transverse axes directions. Incidentally, it is possible to use a vertical machining center in which the spindle head is moved in two mutually transverse axes directions (for example, Z-axis direction and Y-axis direction) and the table is moved in a single axis direction (for example, X-axis direction).

A direction parallel with the axis CL of the main spindle 3 is defined as a Z-axis (an axis in the up-and-down direction in FIG. 1) in the MC 1. Each axial direction for intersecting the Z-axis at right angles and for forming the mutually transverse axes is defined as an X-axis and a Y-axis. Incidentally, for the sake of explanation, a −Y-axis direction, a +Y-axis direction, a +X-axis direction and a −X-axis direction are a forward direction, a backward direction, a rightward direction and a leftward direction of the MC 1, respectively.

The MC1 is provided with an automatic pallet changer (hereinafter referred to as APC) 10 as a pallet changer for changing the pallets 7. The APC 10 is arranged in the vicinity of a machining area 8 of the MC 1 and is controlled by a controller 20. A pallet setup base 11, on which the pallets 7 may be placed, is provided outside the machining area 8.

In the MC 1, the non-machined workpiece 2 placed on the pallet 7 is fed from the pallet setup base 11 to the table 6 by the APC 10. A turning the workpiece 2 by a turning tool and a cutting the workpiece 2 by a rotating tool are performed. When these machining operations have been finished, the pallet 7 on which the machined workpiece 2 is placed is returned back to the pallet setup base 11 from the table 6 by the APC 10.

In this embodiment, a so-called "cradle" type five-axis controlling vertical machining center 1 in which the table 6 is swung is shown as a machine tool.

Incidentally, the five-axis controlling machine tool according to the present invention also includes other type five-axis controlling machine tools, for example, a horizontal machining center, a turning center and the like. In these machine tools, a spindle head is movable in the three mutually transverse axes directions relative to the workpiece supported by the pallet mounted on the table. Then, the table is disposed below a level of the spindle head and is driven by a table drive unit so that the table may be swung and positioned while directing upwardly and also making at least an index motion. Namely, the machine tool has the "cradle" type table.

The APC 10 has the pallet setup base 11 and a pallet change arm 40 (hereinafter referred to arm 40). The arm 40 is swiveled substantially in a horizontal plane about an axis CL1. Also, the arm 40 moves up and down in the direction of the axis CL1 as indicated by an arrow E. The axis CL1 of a swivel center of the arm 40 is directed in the up-and-down direction in parallel with the Z-axis direction.

At least one (a pair of in this case) pallet grip portion 41, which may grip and release the pallet 7, is provided on the arm 40. The arm 40 makes the swivel motion and moves up and down. Thus, the arm 40 has a function for transferring the pallet 7 between the table 6 and the pallet setup base 11 and a function for receiving and discharging the pallet 7 to the table 6 and the pallet setup base 11, respectively.

The arm 40 is adapted to perform only swiveling and ascending and descending but makes no horizontal movement to-and-fro in a linear manner. Accordingly, it is possible to change the pallets 7 in a short period of time and to make the structure of the APC 10 simple and compact.

Incidentally, in a pallet changer according to the present invention, it is possible to manually swivel and ascend and descend the arm 40 instead of the APC 10.

The structure of the MC 1 will now be described.

The MC 1 has a bed 13 forming a base 12 of the MC 1. A saddle 14 is provided on the base 12 and is movable in the X-axis direction (the right-and-left direction) by the guidance of X-axis guide rails 15.

A column 16 is provided on the saddle 14 and is movable in the Y-axis direction (the forward and backward direction) by the guidance of Y-axis guide rails 17. The spindle head 5 is provided in a front portion of the column 16.

The spindle head 5 is movable relative to the column 16 in the Z-axis direction (the up-and-down direction) in parallel with the axis CL of the main spindle 3 by the guidance of Z-axis guide rails 18. The main spindle 3 is supported rotatably by the spindle head 5.

The table 6 is supported by the bed 13 and is disposed below a level of the spindle head 5. The table 6 is driven to be swingable and to make also at least the index motion (in this case, both a rotational motion and the index motion) by a table drive unit 30.

The table 6 detachably supports the pallet 7 and is able to direct upwardly (in the Z-axis direction) and is positioned. The workpiece 2 is detachably fixed on the pallet 7 by a fixture means.

A clamp and unclamp mechanism 19 for clamping and unclamping the pallet 7 is provided on the table 6. The pallet 7 may be clamped on the table 6 by the clamp and unclamp mechanism 19 under the condition that the pallet 7 is mounted on the table 6. A drive portion (not shown), which drives the clamp and unclamp mechanism 19 for clamping and unclamping the pallet 7, is provided on the table 6.

The table drive unit 30 has a swing drive unit 31 for swinging the table 6 about a B-axis and an index drive unit 32 for indexing the pallet 7 and for rotating the pallet 7 about an A-axis relative to the table 6. The B-axis is in parallel with the Y-axis direction and the A-axis is a rotational center of the table 6.

The swing drive unit 31 is disposed in front of the MC 1 and supports the table 6 to be swingable at both ends. The index drive unit 32 is provided on the table 6. The swing drive unit 31 is driven so that the table 6, the index drive unit 32 and the like are swung about the B-axis and are indexed at a predetermined position.

The index drive unit 32 is controlled while the workpiece 2 is cut by a rotating tool 33 mounted on the main spindle 3. Thus, the workpiece 2 on the pallet 7 is indexed at the predetermined position about the A-axis by the index drive unit 32. Under this condition, the workpiece 2 placed on the pallet 7 is cut by the rotating tool 33 mounted on the main spindle 3.

On the other hand, the index drive unit 32 is driven while the workpiece is turned. Then, the pallet 7 and the workpiece 2 supported by the table 6 is rotated about the A-axis. The workpiece 2 is rotated at predetermined rotational speeds about the A-axis under the condition that the workpiece 2 is placed on the pallet 7. Then, the workpiece 2 is subjected to turning by the turning tool 33 mounted on the main spindle 3.

In the MC 1 with such a structure, the spindle head 5 is movable in the three mutually transverse axes directions relative to the workpiece 2 supported by the pallet 7 on the table 6. Also, the table 6 is driven by the table drive unit 30 to be able to make the swing motion, the index motion and the rotational motion. Accordingly, the MC 1 may machine the workpiece 2 in the five-axis control of the X-axis, Y-axis, Z-axis, A-axis and B-axis.

The MC 1 may perform the turning by the turning tool and may perform the cutting by the rotating tool to the workpiece 2. Thus, the number of kinds of the workpieces which may be machined by the MC 1 may be increased. Also, a variety of kinds of machining to those workpieces may be performed so that the MC 1 may exhibit the versatility as a combined machine tool.

A supporting shaft 42 for supporting the arm 40 is disposed between an inside and an outside of the machining area 8 in the APC 10. Namely, the supporting shaft 42 is disposed in the vertical direction (direction in parallel with the Z-axis) in the vicinity of the machining area 8 and outside the machining area 8.

While the APC 10 does not change the pallets 7, a standby position of the arm 40 is a lifted position (swivel height H2 to be described later) of the arm 40 and is outside the machining area 8 and in the vicinity of the machining area 8. Under the standby condition, the arm 40 is ready for operation while facing in the right-and-left direction.

Accordingly, since the pallet setup base 11 is disposed in the vicinity of the table 6 and the length of the arm 40 may be shortened, it is possible to increase the speeds of the pallet changing operation.

The arm 40 in the standby condition is received in a cover (not shown) having an openable shutter. While the arm 40 makes the swivel motion and the ascending and descending motions, the shutter of the cover is opened to allow the arm 40 to pass therethrough.

Since the arm 40 which may be moved up and down ascends up to the predetermined lifted position while the arm 40 makes the swivel motion and is under the standby condition, there is no fear that the arm 40 would interfere with other structural components of the MC 1. Also, the arm 40 is ready for operation and is positioned outside the machining area 8. Accordingly, there is no fear that the moving components such as the spindle head 5 would interfere with the arm 40 while the workpiece 2 is machined within the machining area 8.

In many cases, the operator performs the necessary work while approaching the MC 1 from the right side thereof. Since the arm 40 in the standby condition is directed in the right-and-left direction of the MC1, the arm 40 would never interfere with the operation of the operator.

The pallet grip portions 41 are provided on both end portions or in the vicinity of the both end portions of the arm 40, respectively. Thus, the pair of pallet grip portions 41 is provided on the arm 40. Therefore, the arm 40 may simultaneously change the non-machined workpiece and the machined workpiece at one to thereby make it possible to shorten the time for changing the pallet.

The arm 40 is a so-called "double arm" provided with the pair of pallet grip portions 41. Incidentally, the arm 40 may be a "single arm" provided only with a single pallet grip portion 41 at one end portion of the arm 40 or in the vicinity of the end portion of the arm 40.

The APC 10 has an APC body 43 mounted on the bed 13 and an ascending and descending portion 44, for ascending and descending, supported by the APC body 43. The APC body 43 is disposed on the front side of the bed 13. The ascending and descending portion 44 supports the supporting shaft 42 to be rotatable in a forward direction and a reverse direction.

A swivel servomotor 45 for drivingly rotating the supporting shaft 42 is mounted on the ascending and descending portion 44. When the swivel servomotor 45 is turned on and off, the arm 40 mounted on the supporting shaft 42 is swiveled and positioned at a predetermined position. The arm 40 may be swiveled in a clockwise direction and in a counterclockwise direction in plan view substantially in the horizontal plane, respectively.

The arm 40 may be positioned in a standby position SO for being ready without a pallet changing operation, in a first pallet grip position S1, in a second pallet grip position S2 opposite by 180 degrees to the first pallet grip position S1, and in another predetermined position, respectively.

In some cases, the arm 40 is positioned at the first pallet grip position S1. In those cases, one pallet grip portion 41 is positioned at the table 6 and the other pallet grip portion 41 is positioned at the pallet setup base 11.

In some cases, the arm 40 is positioned at the second pallet grip position S2. In those cases, one pallet grip portion 41 is positioned at the pallet setup base 11 and the other pallet grip portion 41 is positioned at the table 6.

The arm 40 makes the ascending and descending motions between a pallet grip height position H1 and a swivel height position H2 higher than the pallet grip height position H1.

The pallet grip height position H1 is a low height position. Namely, the height position H1 may be a position at which one pallet 7 is mounted on the table 6 and the other pallet 7 may be simultaneously mounted on the pallet setup base 11 under the condition that the pallets 7 are gripped by the pair of pallet grip portions 41 of the arm 40, respectively.

On the other hand, the swivel height position H2 is a predetermined height position at which there is no interference even if the arm 40 is swiveled under the condition that the arm 40 grips the pallets 7.

The ascending and descending portion 44 is moved by a guidance of a linear motion rolling guide 46, which is provided on the APC body 43 and on the ascending and descending portion 44, for ascending and descending the arm 40 through the supporting shaft 42. Namely, the ascending and descending portion 44 is moved to-and-fro in the direction of the axis CL1 (in the up-and-down direction) as indicated by the arrow E.

A pair of parallel guide rails 47 is provided to extend in a direction in parallel with the axis CL1 (the up-and-down direction) on the APC body 43 or the bed 13. A pair of slide bodies 48 is fixed to the ascending and descending portion 44. The guide rails 47 and the slide bodies 48 constitute the linear motion rolling guide 46.

A screw shaft 50 of a ball screw is disposed between the two guide rails 47 in parallel with the guide rails 47. A nut 51 fixed to the ascending and descending portion 44 is threadedly engaged with the screw shaft 50.

Both ends of the screw shaft 50 are rotatably supported by bearing portions 52. The screw shaft 50 is drivingly rotated in a forward direction and a reverse direction by an ascending and descending servomotor 55 through toothed pulleys 53a and 53b, a toothed belt 54 and the like.

The screw shaft 50 is driven by the servomotor 55 and is rotated. Then, the ascending and descending portion 44 to which the nut 51 is fixed is guided and supported by the guide rails 47 and is moved to-and-fro in the direction of the axis CL1 (the up-and-down direction). Thus, the arm 40 may move upwardly and downwardly between the pallet grip height position H1 and the swivel height position H2 higher than the pallet grip height position H1 through the supporting shaft 42.

The pallet setup base 11 is disposed in a predetermined position, at which the work of the operator is easily done, and outside the machining area 8. The pallet setup base 11 is disposed on the APC body 43. The pallet 7 may be placed detachably onto the pallet setup base 11.

Incidentally, the operation to mount the non-machined workpiece 2 on the pallet 7 and the operation to remove the machined workpiece 2 from the pallet 7 may be performed on the pallet setup base 11 by an input of the operator. It is preferable that an automatic pallet feeding unit is separately provided and the pallet 7 is fed and discharged to the pallet setup base 11 by utilizing this automatic pallet feeding unit so that the perfectly automatic operation would be possible without any manual work.

The machining area 8 is covered by a splash guard (not shown) so that the cutting fluid (coolant) or the chips may be prevented from splashing to the outside of the machining area 8. A shutter for changing the workpieces and a shutter for changing the tools are provided on the splash guard and may be opened and closed, respectively. These shutters are closed and opened so that the workpieces 2 and the tools 33 may be changed.

An automatic tool changer (hereinafter referred to as ATC and not shown) for receiving a plurality of tools and for changing the tools is provided on the base 12. The ATC has a function to index a desired tool (or an empty tool receiving portion) to the changing position and to automatically change the tools to the main spindle 3.

The rotating tools for cutting the workpieces 2 in addition to the turning tools (tools for boring, tools for facing and the like) for turning the workpieces 2 are stocked in the ATC. Incidentally, it is possible to provide a tool magazine, for stocking a plurality of tools, separately from the ATC.

The controller 20 has an operating board 21. A display means and an input means are provided on the operating board 21 so that the MC 1 and the stocker 7 may be operated. As the display means, there are provided a display, a CRT and the like, and as the input means, there are a key board, a touch panel and the like.

A coolant tank (not shown) for reserving the cutting fluid to be fed to a machining position is disposed in the vicinity of the bed 13.

The operations of the MC 1 and the APC 10 will now be described with reference to FIGS. 1 to 3J. Incidentally, FIGS. 3A to 3J show a case of steps shifting in order from a step shown in FIG. 3A to a step shown in FIG. 3J.

Figure 3A:
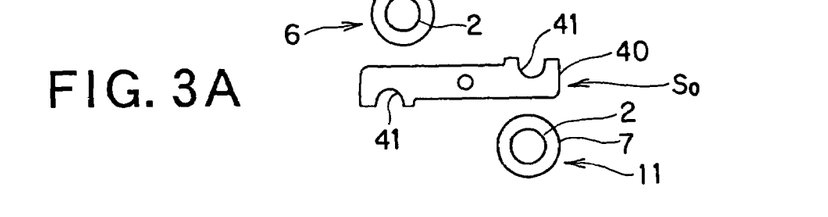
FIGS. 3A to 3J are illustrations of the operation of the automatic pallet changer.

As shown in FIG. 3A, before the MC 1 starts the pallet changing operation, the machined workpiece 2 is fixed on the pallet 7 mounted on the table 6. The non-machined workpiece 2 to be machined is fixed on the pallet 7 placed on the pallet setup base 11.

Also, the swing drive unit 31 is driven to swing the table 6 and to direct the pallet 7 upwardly. The A-axis of the table 6 is kept in parallel with the axis CL1 of the arm 40 (i.e., in parallel with Z-axis direction).

On the other hand, in the APC 10, the arm 40 is positioned in the standby position SO while being directed in the X-axis direction. Also, the arm 40 is ready for operation under the condition that the arm 40 is raised to the swivel height position (i.e., the predetermined ascending position) H2.

Figure 3B:
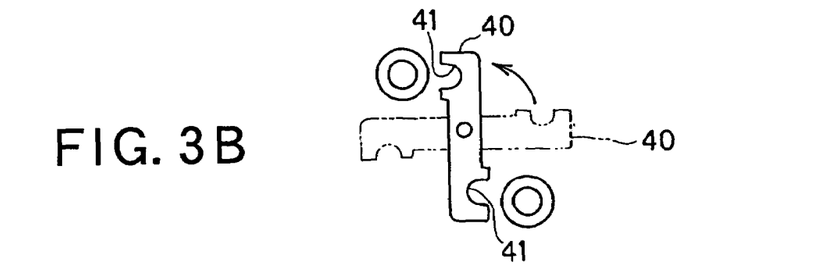

When the pallet changing command is outputted by the controller 20, the APC 10 and the MC 1 start the pallet changing operation in accordance with this command. Namely, as shown in FIG. 3B, the swivel servomotor 45 is driven and the arm 40 is swiveled through a predetermined angle in the counterclockwise direction through the supporting shaft 42.

Figure 3C:
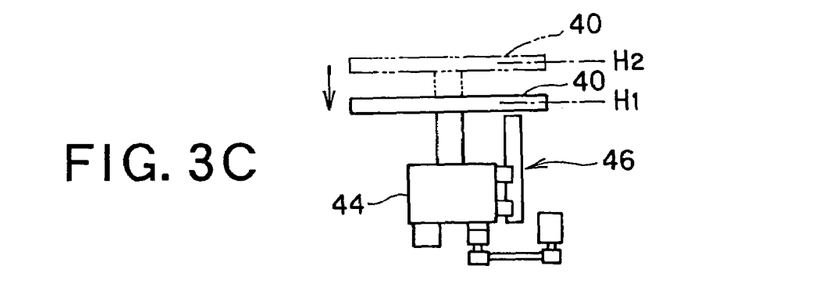

As shown in FIG. 3C, the ascending and descending servomotor 55 is driven and the ascending and descending portion 44 is moved downwardly through the linear motion rolling guide 46. Thus, the arm 40 is moved downwardly from the swivel height position H2 to the pallet grip height position H1 which is lower than the swivel height position H2.

Figure 3D:
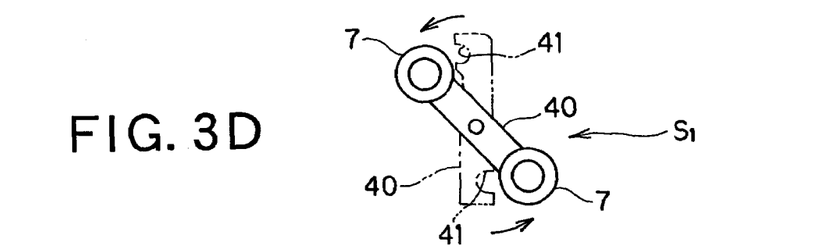

Subsequently, as shown in FIG. 3D, further the arm 40 is somewhat swiveled in the counterclockwise direction. Then, the arm 40 is positioned in the first pallet grip position S1. One pallet grip portion 41 grips the pallet 7 mounted on the table 7, and the other pallet grip portion 41 grips the pallet 7 placed on the pallet setup base 11. Thereafter, the clamp and unclamp mechanism 19 of the table 6 is brought into the unclamping condition so that the pallet 7 is able to be separated from the table 6.

Figure 3E:
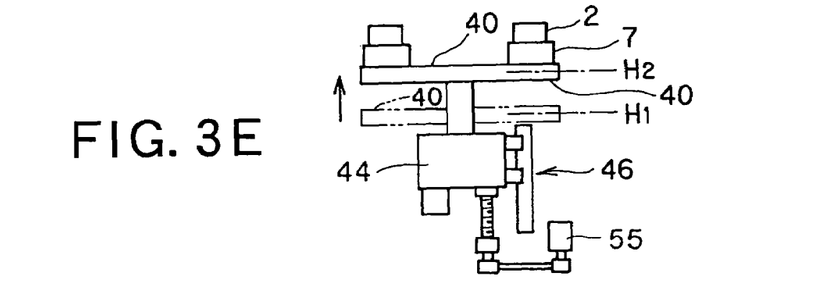

Subsequently, as shown in FIG. 3E, the ascending and descending servomotor 55 is driven to raise the ascending and descending portion 44. Then, the arm 40 is raised from the pallet grip height position H1 to the swivel height position H2 while the pallets 7 are respectively gripped by both the pallet grip portions 41 of the arm 40.

Figure 3F:
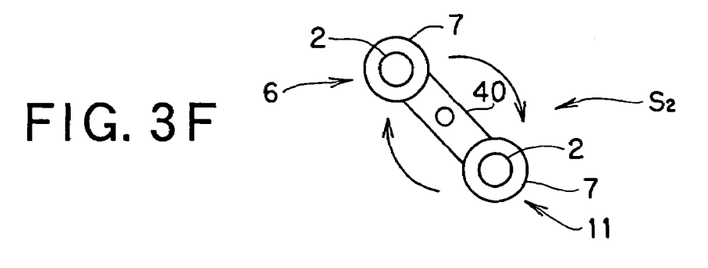

Subsequently, as shown in FIG. 3F, the swivel servomotor 45 is driven in the reverse rotational direction. The arm 40 is swiveled through 180 degrees in the clockwise direction to locate the arm 40 in the second pallet grip position S2. Thus, one pallet grip portion 41 is moved to the pallet setup base 11 and the other pallet grip portion 41 is moved to the table 6.

Figure 3G:
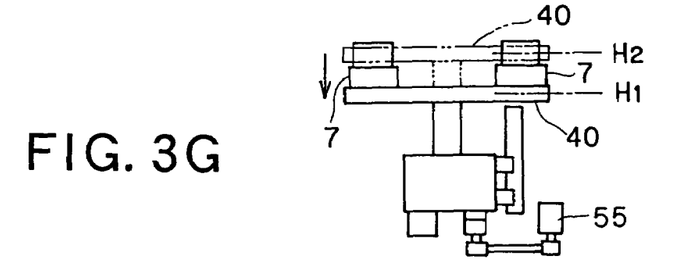

Under this condition, as shown in FIG. 3G, the ascending and descending servomotor 55 is driven. The arm 40 is moved down from the swivel height position H2 to the pallet grip height position H1.

Thus, the pallet 7 on which the non-machined workpiece 2 is mounted is mounted on the table 6. The pallet 7 on which the machined workpiece 2 is mounted is placed on the pallet setup base 11.

Figure 3H:
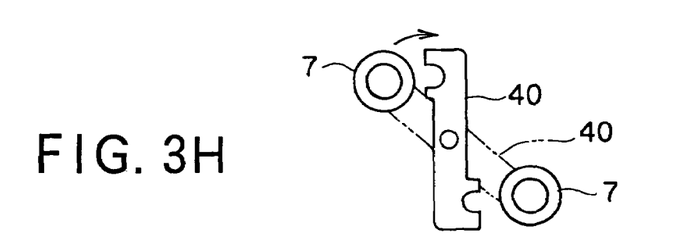

Subsequently, as shown in FIG. 3H, the swivel servomotor 45 is drive. The arm 40 is somewhat swiveled in the clockwise direction to separate both the pallet grip portions 41 away from the pallets 7, respectively.

Figure 3I:
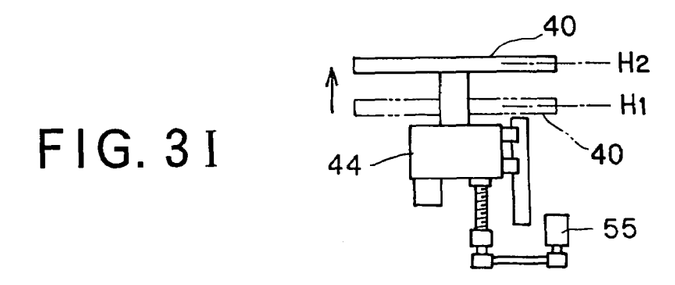

Then, as shown in FIG. 3I, the ascending and descending servomotor 55 is driven. The ascending and descending portion 44 is raised so that the arm 40 is raised from the pallet grip height position H1 to the swivel height position H2.

Figure 3J:
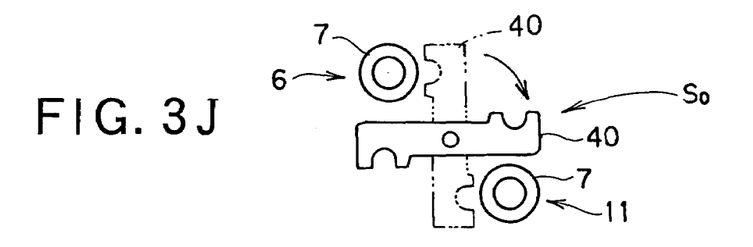

Finally, as shown in FIG. 3J, the swivel servomotor 45 is driven. The arm 40 is swiveled through a predetermined angle in the clockwise direction and is moved in the standby position S0. Under this condition, the arm 40 is ready for operation until a next pallet changing command is outputted.

On the other hand, the clamp and unclamp mechanism 19 of the table 6 is operated to clamp the pallet 7 on the table 6. Thereafter, the operation is moved on the step on which the non-machined workpiece 2 fixed to the pallet 7 is to be machined.

The machined workpiece is removed from the pallet 7 placed on the pallet setup base 11 by the operator. Thereafter, the operator performs the setup changing operation for fixing the non-machined workpiece to be machined to the pallet 7.

In the case in which the non-machined workpiece 2 placed on the pallet 7 and fed to the table 6 is cut, the index drive unit 32 is driven. The workpiece 2 is indexed and positioned at a predetermined position.

Then, the rotating tool 33 mounted on the main spindle 3 is rotated at predetermined rotational speeds. The workpiece 2 is cut by the rotating tool 33 while the spindle head 5 is moved in the three mutually transverse axes directions relative to the workpiece 2 fixed to the pallet 7 mounted on the table 6.

On the other hand, in the case in which the workpiece 2 is turned, the workpiece 2 and the pallet 7 mounted on the table 6 are rotated at predetermined rotational speeds by the index drive unit 32. Under this condition, the spindle head 5 is moved in the two mutually transverse axes directions or in the three mutually transverse axes directions. Thus, the workpiece 2 may be turned by the turning tool 33 mounted on the main spindle 3.

Also, in the case in which other kinds of cutting are to be applied to the workpiece 2 or in the case in which the workpiece 2 is turned by another turning tool, the tools are changed between the main spindle 3 and the ATC.

Thus, the cutting and/or the turning of the one workpiece 2 has been completed. Then, the operations for machining the workpiece 2 enter again the machining steps after changing the machined workpiece 2 and the next non-machined workpiece 2 by the same steps and operations as the above-described steps and operations.

Such steps and operations are repeated to thereby perform the cutting, the turning and the like to the workpiece 2 in order. Thus, it is possible to continuously and automatically perform the cutting, the turning and the like to the workpiece 2 in order as desired.

When the swing drive unit 31 is driven, it is possible to index the workpiece 2 under the condition that the workpiece 2 is directed in the horizontal direction and in the vertical direction and is also directed in a slanted direction as desired in addition. Therefore, it is possible to perform a variety of kinds of machining such as cutting and turning as desired.

In the above-described APC 10, the arm 40 is adapted to perform the only swiveling and the ascending and descending but makes no horizontal movement to-and-fro in a linear manner. Accordingly, it is possible to change the pallets 7 in a short period of time and to make the structure of the APC 10 simple and compact in comparison with a conventional APC.

As an example of time taken to change the single pallet 7, in the conventional case in which the reciprocating base was moved to-and-fro in the horizontal direction in the linear manner, it took about 20 seconds to change the pallet 7. In contrast, in the APC 10 according to the present invention, it took about 12 to 13 seconds to change the single pallet 7 to thereby shorten the time by 35 to 40% of the conventional case.

The embodiment of the present invention has been described. However, the present invention is not limited to the above-described specific embodiment. It is possible to make various modifications and additions within the scope of the invention.

Incidentally, the same reference numerals are used to indicate the same or corresponding components or members throughout the drawings.

What is claimed is:

1. A pallet changer, for changing pallets, provided on a machine tool being a five-axis controlling machine tool, said machine tool comprising:
   a spindle head being movable in three mutually transverse axes directions relative to a workpiece supported by a pallet mounted on a table; and
   said table disposed below a level of said spindle head, said table is driven by a table drive unit so that said table is swingable and positioned while being directed in an upward direction and also making at least an index motion, wherein said table as driven by said table drive unit is also capable of making rotational motion as well as the index motion,
   said pallet changer comprising:
   a pallet setup base, provided outside a machining area of said machine tool, for placing the pallet on said pallet setup base; and
   a pallet change arm, which is provided with at least one pallet grip portion for gripping and releasing the pallet, for making a swivel motion substantially in a horizontal plane and for moving up and down,
   wherein said pallet change arm makes the swivel motion and moves up and down so that the pallet is transferred between said table and said pallet setup base and is received and discharged to said table and said pallet setup base, respectively.

2. The pallet changer for the machine tool according to claim 1, wherein a supporting shaft for supporting said pallet change arm is disposed in the vicinity of the machining area while remaining outside the machining area, and a standby position of said pallet change arm is outside the machining area and in remaining the vicinity of the machining area and is a lifted position of said pallet change arm.

3. The pallet changer for the machine tool according to claim 2, said pallet changer comprising: an automatic pallet changer body mounted on a bed; and an ascending and descending portion, supported by said automatic pallet changer body, for ascending and descending and for supporting said supporting shaft to be rotatable in a forward direction and a reverse direction, wherein a swivel servomotor for drivingly rotating said supporting shaft is mounted on said ascending and descending portion, and said pallet change arm is swiveled and positioned at a predetermined position when the swivel servomotor is turned on and off, and said pallet change arm is swiveled in a clockwise direction and in a counterclockwise direction substantially in the horizontal plane in plan view, respectively.

4. The pallet changer for the machine tool according to claim 2, wherein said pallet change arm is positioned in a standby position for being ready without a pallet changing operation in which the pallet change arm is in a first pallet grip position or in a second pallet grip position in which the second pallet grin position opposite the first pallet grip position by 180 degrees.

5. The pallet changer for the machine tool according to claim 1, wherein the pallet grip portions are provided on both end portions or in the vicinity of the both end portions of said pallet change arm, respectively.

6. A machine tool provided with a pallet changer, said machine tool being a five-axis controlling machine tool comprising:
   a spindle head being movable in three mutually transverse axes directions relative to a workpiece supported by a pallet mounted on a table; and
   said table disposed below a level of said spindle head, said table is driven by a table drive unit so that said table is swingable and positioned while being directed in an upward direction and also making at least an index motion, wherein said table as driven by said table drive unit is also capable of making rotational motion as well as the index motion,
   said pallet changer comprising:
   a pallet setup base, provided outside a machining area of said machine tool, for placing the pallet on said pallet setup base; and
   a pallet change arm, which is provided with at least one pallet grip portion for gripping and releasing the pallet, for making a swivel motion substantially in a horizontal plane and for moving up and down,
   wherein said pallet change arm makes the swivel motion and moves up and down so that the pallet is transferred between said table and said pallet setup base and is received and discharged to said table and said pallet setup base, respectively.

7. The machine tool according to claim 6, wherein said machine tool is a five-axis controlling vertical machining center in which an axis of a main spindle supported rotatably by said spindle head is directed substantially in the vertical direction to a floor surface so that said table makes a rotational motion in addition to the index motion.

8. The machine tool according to claim 6, wherein said table drive unit comprises: a swing drive unit for swinging said table; and an index drive unit for indexing the pallet and for rotating the pallet relative to said table, wherein said swing drive unit for supporting said table to be swingable at both ends is disposed in front of said machine tool, and said index drive unit is provided on said table, and said swing drive unit is driven so that said table and said index drive unit are swung and indexed at a predetermined position.

9. The machine tool according to claim 8, wherein said machine tool cuts a workpiece by using a rotating tool and turns a workpiece by using a turning tool.

10. A pallet changer, for changing pallets, provided on a machine tool being a five-axis controlling machine tool, said machine tool comprising:
   a spindle head being movable in three mutually transverse axes directions relative to a workpiece supported by a pallet mounted on a table; and
   said table disposed below a level of said spindle head, said table is driven by a table drive unit so that said table is swingable and positioned while being directed in an upward direction and also making at least an index motion,
   said pallet changer comprising:
   a pallet setup base, provided outside a machining area of said machine tool, for placing the pallet on said pallet setup base; and
   a pallet change arm, which is provided with at leat one pallet grip portion for griping and releasing the pallet, for making a swivel motion substantially in a horizontal plane and for moving up and down,
   wherein said pallet change arm makes the swivel motion and moves up and down so that the pallet is transferred between said table and said pallet setup base and is received and discharged to said table and said pallet setup base, respectively, and
   wherein said pallet change arm which is moved up and down ascends up to a predetermined lifted position, while said pallet change arm makes the swivel motion and is under a standby condition, so that said pallet change arm does not interfere with other structural components of said machine tool.

11. A machine tool provided with a pallet changer, said machine tool being a five-axis controlling machine tool comprising:
   a spindle head being movable in three mutually transverse axes directions relative to a workpiece supported by a pallet mounted on a table; and
   said table disposed below a level of said spindle head, said table is driven by a table drive unit so that said table is swingable and positioned while being directed in an upward direction and also making at least an index motion,
   said pallet changer comprising:
   a pallet setup base, provided outside a machining area of said machine tool, for placing the pallet on said pallet setup base; and
   a pallet change arm, which is provided with at least one pallet grip portion for gripping and releasing the pallet, for making a swivel motion substantially in a horizontal plane and for moving up and down,
   wherein said pallet change arm makes the swivel motion and moves up and down so that the pallet is transferred between said table and said pallet setup base and is received and discharged to said table and said pallet setup base, respectively, and
   wherein said pallet change arm which is moved up and down ascends up to a predetermined lifted position, while said pallet change arm makes the swivel motion and is under a standby condition, so that said pallet change arm does not interfere with other structural components of said machine tool.

* * * * *